(12) United States Patent
Hoegener et al.

(10) Patent No.: US 7,082,023 B2
(45) Date of Patent: Jul. 25, 2006

(54) METHOD AND CIRCUIT ARRANGEMENT FOR FUNCTION MONITORING OF AN ELECTRONIC-MECHANICAL POSITION SWITCH

(75) Inventors: Hans-Juergen Hoegener, Niederkassel (DE); Juergen Volberg, Troisdorf (DE); Guido Voellmar, Cologne (DE); Bernd Wolff, Hennef (DE)

(73) Assignee: Moeller GmbH, Bonn (DE)

( * ) Notice: Subject to any disclaimer, the term of this patent is extended or adjusted under 35 U.S.C. 154(b) by 234 days.

(21) Appl. No.: 10/847,168

(22) Filed: May 17, 2004

(65) Prior Publication Data

US 2004/0228065 A1    Nov. 18, 2004

(30) Foreign Application Priority Data

May 17, 2003 (DE) ................................ 103 22 385

(51) Int. Cl.
*H01H 47/32* (2006.01)
*G06F 11/00* (2006.01)

(52) U.S. Cl. ..................... 361/186; 361/179; 714/55
(58) Field of Classification Search ................ 361/179, 361/186; 714/55
See application file for complete search history.

(56) References Cited

U.S. PATENT DOCUMENTS 4,980,793 A * 12/1990 Glowczewski et al. ..... 361/154

| 5,184,025 | A | * | 2/1993 | McCurry et al. ............. 307/66 |
| 5,214,560 | A | * | 5/1993 | Jensen ........................ 361/93.2 |
| 5,559,664 | A | * | 9/1996 | Dogul et al. ................ 361/191 |
| 6,145,103 | A | * | 11/2000 | Typaldos et al. ............. 714/55 |

FOREIGN PATENT DOCUMENTS

DE      3734431       3/1999
DE    202 03 214      7/2002

OTHER PUBLICATIONS

Kloeckner Moeller brochure, "Safe and Reliable Monitoring and Indication", W 13-7364 GB, Aug. 1996.

* cited by examiner

*Primary Examiner*—Phuong T. Vu
*Assistant Examiner*—Scott Bauer
(74) *Attorney, Agent, or Firm*—Darby & Darby

(57) ABSTRACT

In a method for function monitoring of an electronic-mechanical position switch in which the wiper voltage of a potentiometer acted upon by an actuation tappet is evaluated in comparison to a threshold value in order to activate or deactivate electronic contacts, during first or second test intervals a microcontroller interrupts watchdog signals or contact-closing control signals and checks the state of the switching contacts. If the expected state transition of the switching contacts from the closed into the open state does not occur, then the control signals make the transition to the contact-opening signal level or the watchdog signals are discontinued.

11 Claims, 7 Drawing Sheets

METHOD AND CIRCUIT ARRANGEMENT FOR FUNCTION MONITORING OF AN ELECTRONIC-MECHANICAL POSITION SWITCH

Priority is claimed to German patent application 103 22 385.1, the subject matter of which is hereby incorporated by reference herein.

The invention relates to a method and to a circuit arrangement for function monitoring of an electronic-mechanical position switch wherein a microcontroller detects a wiper potential that is present at the wiper of a potentiometer, evaluates the wiper potential in comparison to a stored threshold value and, depending on whether the wiper potential exceeds or falls below the threshold value, at least one switching contact is closed or opened via a control signal.

BACKGROUND

The product information no. W 13-7364, 4/1996 of the Klöckner-Moeller Company titled "Monitoring and detecting: reliable and safe, position switch AT" describes an electromechanical position switch. In a housing, there are mechanical switching contacts, for example, pairs of or individual contacts of break contacts and/or make contacts, and there is a butt tappet that can be slid lengthwise for direct mechanical actuation of the switching contacts. In order to be able to use the position switch in the most versatile manner possible, replaceable drive heads are placed in front of the butt tappets. Thus, as desired, a drive head with a swiveling lever, a roller lever, an adjustable roller lever or a torsion bar can be attached to the housing of the position switch.

An electronic-mechanical position switch is known from German utility model DE 202 03 214 U1. An actuation tappet, a potentiometer, a microcontroller and electronic switching contacts are arranged in a housing. The actuation tappet is coupled to the wiper of the potentiometer. When the tappet is actuated, a changing electric signal is fed to the microcontroller and this signal brings about a change in the state of the switching contacts when the signal exceeds or falls below a programmed threshold value. The switching contacts are connected to the clamp terminals on the output side. In order to set the switch-over point, it is proposed to program the threshold value via a programming connection or via a selector switch, or else to make a selection from a number of predetermined threshold values that are stored in a microcontroller. No information is provided as to how failures in the electronic system can be detected in order to prevent erroneous output signals from leading to erroneous control operations at the periphery of the position switch.

German patent DE 37 34 431 C2 describes a method for monitoring the state transition of final stage circuits for final control elements from the closed to the open state. During operation, the trip-on signals are periodically interrupted by test signals. Feedback to a microcomputer is sent from the final stage circuits and, if the state transition does not occur, said microcomputer ensures that the final stage circuits are permanently set to the open state. The test signals are shorter than the response-reaction time of the final control elements. The microcomputer is not monitored.

SUMMARY OF THE INVENTION

Therefore, an object of the present invention is to provide a method for monitoring the function of an electronic-mechanical position switch.

The present invention provides a method for function monitoring of an electronic-mechanical position switch, the electronic-mechanical position switch including: a housing; an actuation tappet; a potentiometer configured to be acted upon by the actuation tappet; an electronic switching contact; a microcontroller configured to emit dynamically-changing watchdog signals and to detect a wiper potential present at a wiper of the potentiometer, compare the wiper potential to a stored threshold value and, depending on whether the wiper potential is above or below the threshold value, trigger a closing or opening of the electronic switching contact via a control signal; a power supply device; and a clamp terminal. The method includes the consecutive steps:

A) discontinuing, at first test intervals, an emitting of the watchdog signals and, in response, interrupting a power supply to the electronic switching contact using a switching device configured to monitor the watchdog signals;

B) monitoring the electronic switching contact by the microcontroller and, if a first state transition of the electronic switching contact from a closed into an open state occurs, emitting again the watchdog signals, and, if the first state transition does not occur, setting the control signal as to open the electronic switching contact;

C) switching over, during second test intervals that are staggered with respect to the first test intervals, the control signal as to open the electronic switching contact; and D) monitoring the electronic switching contact by the microcontroller and, if a second state transition of the electronic switching contact from the closed into the open state occurs, switching the control signal back as to close the electronic switching contact, and, if the second state transition does not occur, terminating the emitting of the watchdog signals.

The present invention also provides a switching arrangement for function monitoring of an electronic-mechanical position switch, the switching arrangement comprising:

a housing;

an actuation tappet;

a potentiometer configured to be acted upon by the actuation tappet;

a power supply device configured to supply a potential;

a microcontroller including a watchdog signal output configured to emit dynamically-changing watchdog signals, the watchdog signals being discontinued in a first test interval;

a time stage connected to the watchdog signal output, an output of the time stage assuming a first output state when the watchdog signals are present and assuming a second output state when the watchdog signals are not present;

a supply driver connected to the time stage, an output of the supply driver conducting the potential when the time stage assumes the first output state and blocking the potential when the time stage does not assume the first output state it;

an electronic switching contact, the electronic switch contact being included in an output circuit, the output circuit being supplied by the output of the supply driver; and a clamp terminal;

wherein the microcontroller includes:

a control output connected to the output circuit and configured to provide the control signal, the control signal briefly assuming, in a presence of a closing signal level during a second test interval, an opening signal level, the second test interval being staggered relative to the first test interval; and a control input connected to an output of the electronic switching contact;

wherein the microcontroller is configured to:

detect a wiper potential present at a wiper of the potentiometer;

compare the detected wiper potential to a stored threshold value;

depending on whether the detected wiper potential is above or below the threshold value, trigger a closing or opening of the electronic switching contact via the control signal; and process a control input signal present at the control input so as to:

resume emitting watchdog signals if a first transition of the electronic switching contact from a closed into an open state occurs in the first test interval;

permanently set the control signal at the opening state level if the first state transition does not occur in the first test interval; and discontinue emitting the watchdog signals if a second state transition of the electronic switching contact from the closed state to the open state does not occur in the second test interval.

The method according to the invention tests the watchdog monitoring on the one hand and the current-breaking capacity of the at least one electronic switching contact on the other hand. The watchdog monitoring serves to detect failures of the microcontroller and to reliably cause the switching contact to make the transition to the open state in order to avoid erroneous control operations at the periphery of the position switch. For this purpose, in a known manner, the microcontroller generates watchdog signals whose absence would indicate a failure of the microcontroller. The term "current-breaking capacity" means that when the tappet passes the switch-over point in the appropriate direction, the switching contact that had been closed until then does indeed open. When the watchdog function is tested, if the microcontroller is functioning properly, the process steps A and B are carried out as a precautionary measure to determine whether an absence of the watchdog signals is indeed detected by the switching means that are monitoring the watchdog signals. When the current-breaking capacity is tested, the process steps C and D are carried out to determine whether the switching contact that is in the closed state is capable of being opened. In case of proper functioning, the closed state of the electronic switching contact is effectuated by the closing signal level of the control signal. However, during the output of the closing control signal, a component failure can occur on the way from the output of the microcontroller to the switching contact, as a result of which the switching contact can no longer assume the open state, for example, as a result of the fusing of the output electrodes of the electronic switching contact. Such failures have to be detected at an early point in time since in some cases, the actuation tappet does not pass through the switching point for a long time.

If the test according to the process steps A, B, and C, D yields positive results, the first and second test intervals—which are essentially determined by material-related and program-related delay times during which the closed switching contact is briefly opened—are of short duration (typically 200 μs to 400 μs) and thus do not have a perceptible effect on the periphery of the position switch.

Advantageously, the first and the second test intervals occur at periodical intervals, preferably after a time interval comprising 500 to 1200 program cycles of the microcontroller, which corresponds to a test period of 2 to 6 seconds.

An advantageous embodiment of the process according to the invention consists in that, in order to shield off coincidental disturbances, the switching contact is permanently open only in case of the repeated absence of the expected state transition of the switching contact during the first or the second test interval, that is to say, only after the repeated execution of process steps A through D. A number of two process runs each time already leads to a considerable improvement of the interference immunity.

Another advantageous embodiment consists in that, in order to improve the function monitoring, the logical state predefined by the microcontroller is additionally compared by checking back with the actual physical state of the at least one switching contact and in that, if there is no correspondence, the control signal assumes the opening signal level and the watchdog signals are not emitted.

In response to erroneous watchdog monitoring, to an absent current-breaking capacity or to an illogical output state, it is advantageous for the microcontroller to emit an error message signal, for example, in order to actuate an LED display installed in the housing.

With the switching arrangement according to the invention, including the program-controlled microcontroller, the watchdog monitoring as well as the current-breaking capacity of the at least one electronic switching circuit are checked in order to their hardware functions.

An active time stage detects watchdog signals coming from the microcontroller and assumes different output states, depending on whether dynamically changing watchdog signals are present or not. If watchdog signals are present, the time stage activates a supply driver to apply a supply potential to at least one output circuit containing the at least one switching contact. With the start of the first test intervals, the microcontroller switches off the watchdog signals, in response to which the time stage deactivates the supply driver in order to disconnect the output circuit from the supply potential. If the switching contact was previously in the closed state, then, if the time stage and the supply driver are intact, it makes the transition to the open state. The output of the switching contact is fed back to the microcontroller for purposes of being checked against the expected logical result. After the detection of the proper state transition, the microcontroller once again emits watchdog signals, in response to which the time stage once again activates the supply driver so that the supply potential passes through and the briefly opened switching contact closes again. In contrast, if the watchdog monitoring is disrupted, that is to say, if the expected state transition does not occur, then the switching contact is inevitably opened via the output circuit by setting the control signal to the opening signal level.

At the beginning of the second test intervals, the control signal provided by the microcontroller—if by then it has assumed the closing signal level—makes the transition to the opening signal level. After the microcontroller has read in the proper state transition from the fed back output of the switching contact, it once again closes the briefly opened switching contact by reducing the opening signal level. In contrast, if the current-breaking capacity of the output circuit is absent, that is to say, if the expected state transition does not occur, the switching contact is inevitably opened via the time stage and via the supply driver by switching off the watchdog signals.

The duration (typically 200 μs to 400 μs) of the opening of the at least one switching contact for testing purposes is essentially determined by material-related and program-related delay times of the circuit arrangement and does not have a perceptible effect on the periphery of the position switch.

An advantageous embodiment of the switching arrangement according to the invention consists in that the time stage is consecutively made up of a first and a second amplifier stage having a passive differentiating element or an integrating element at the input. Through dynamic watchdog signals that are present at the differentiating element, the output state of the first amplifier stage likewise changes dynamically, with the result that the integrating element cannot be charged or discharged to a threshold level, as a result of which the second amplifier stage remains in the first output state. In the case of discontinued watchdog signals, the first amplifier stage assumes a defined state, with the result that the integrating element exceeds or falls below the threshold level and consequently the second amplifier stage makes the transition to the second output state.

It is advantageous to arrange an additional decoupling amplifier stage between the output of the switching contact and the control input, especially if said amplifier stage is provided with interference-suppression means.

It is advantageous to equip the microcontroller with a message output to emit an error message via an optical signal element in case of a faulty test result.

BRIEF DESCRIPTION OF THE DRAWINGS

Additional details and advantages of the invention ensue from the following embodiments explained with reference to drawings. The drawings show the following.

DETAILED DESCRIPTION

Figure 1:
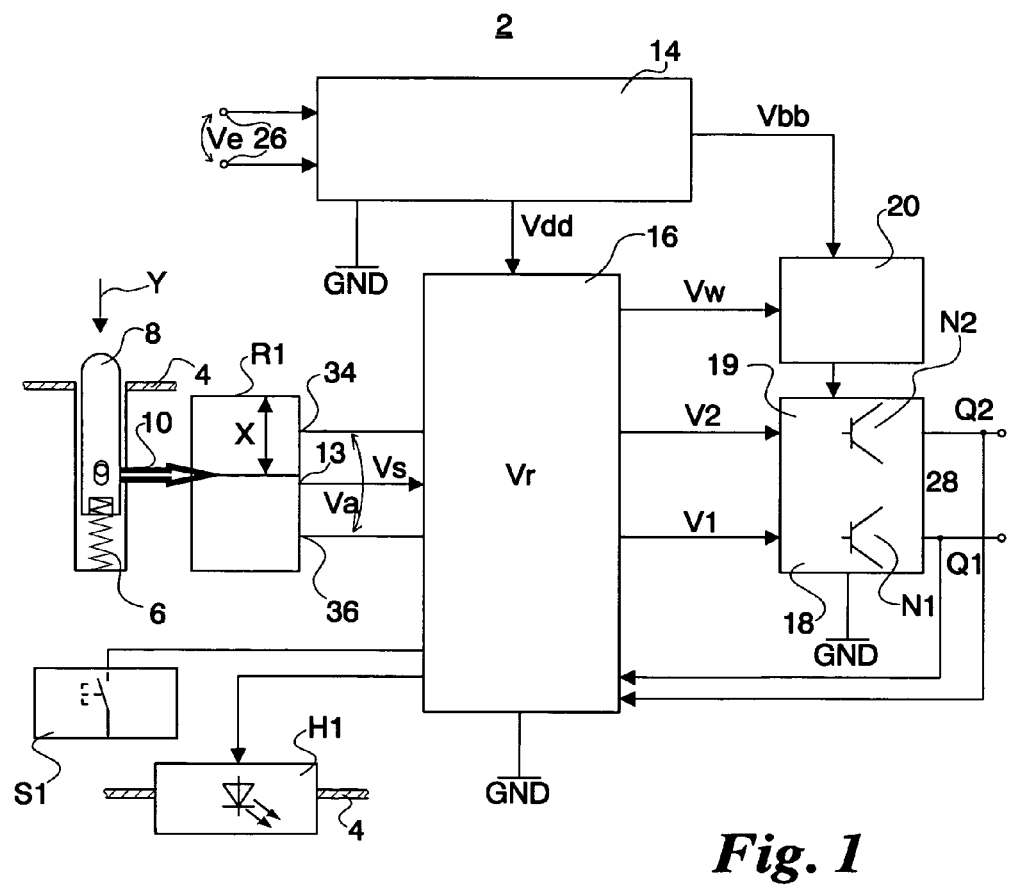
FIG. 1: a block diagram of an electronic-mechanical position switch operated using the method according to the invention.

According to FIG. 1, the electronic-mechanical position switch 2 is set up in a box-like housing 4 that is, however, only indicated in rudimentary form. As the mechanical components, the housing 4 contains an actuation tappet 8 that can be moved in the actuation direction Y along with or opposite to the spring force of a pressure spring 6 as well as a wiper 10 of a potentiometer R1, said wiper being coupled to said actuation tappet 8. The housing 4 also contains conventional power supply means 14, a microcontroller 16, a first and a second output circuit 18 or 19, monitoring switching means 20, an LED display H1 and an acknowledgement key S1. The electronic components are attached to a printed circuit board or to two printed circuit boards joined together. The acknowledgement key S1 is configured as a DIP switch. Via a pair of first clamp terminals 26, an input voltage Ve is supplied that is converted by means of the power supply means 14 into a positive first supply potential Vbb and into a second positive supply potential Vdd that is lower than the first. The supply potentials Vbb and Vdd refer to the reference potential GND (ground potential). The output circuits 18 and 19, which each contain a first and a second electronic switching contact N1 or N2, are fed via the switching means 20 with the first supply potential Vbb and the microcontroller 16 is fed directly with the second supply potential Vdd.

In order to increase the possibilities of use of the position switch 2, replaceable drive heads can be installed in front of the actuation tappet 8. The position of the actuation tappet 8 is transferred to the wiper 10 of the potentiometer R1. Depending on the wiper position X, a different wiper potential Vs is present at the wiper 10. The wiper potential Vs that refers to the reference potential GND is converted by the microcontroller 16 into a digital value and compared to a stored threshold value Vr. When the wiper potential Vs is detected, an external voltage Va, supplied by the microcontroller 16, is applied to the two external connections 34 and 36 of the potentiometer R1. The microcontroller 16 emits control signals V1 and V2 whose signal levels depend on whether the value of the wiper potential Vs lies above or below the threshold value Vr. By means of the control signals V1 and V2, as a function of the wiper position X and depending on whether the electronic switching contacts N1 and N2 as such are to function as a make contact or as a break contact, the switching contacts N1 and N2 are regulated into the closed or open state. The determination of whether the contacts N1 and N2 are functioning as a break contact or as a make contact is made by programming the microcontroller 16. If the position X of the wiper 10 is or moves above the switch-over point determined by the threshold value Vr, then the driver output Q1 or Q2 is blocked in case of a break contact, but said driver output Q1 or Q2 is conductively connected to the first supply potential Vbb in case of a make contact. In contrast, if the position X of the wiper 10 is or moves below the switch-over point, the corresponding driver output Q1 or Q2 is conductively connected to the first supply potential Vbb in the case of a break contact, but it is non-conductive in the case of a make contact. The driver outputs Q1 and Q2 are connected with a pair of second clamp terminals 28 to which electric and/or electronic peripheral devices are connected that are to be actuated by the position switch 2.

The acknowledgement key S1 connected to the microcontroller 16 serves to set a desired position of the actuation tappet 8 as the new switch-over point of the position switch 2 in that, by actuating the acknowledgement key S1, the appertaining wiper potential Vs is taken in the microcontroller 16 as the new determining threshold value Vr. Under certain operating conditions, the microcontroller 16 emits different signals to the LED display H1 in order to indicate errors, confirmations and certain states by lighting up or blinking at different blinking frequencies. The monitoring switching means 20 serves to monitor the proper functioning of the microcontroller 16 and monitors the watchdog signals Vw emitted by the microcontroller 16.

In order to explain the method according to the invention for function monitoring of the electronic-mechanical position switch 2 according to FIG. 1, reference will be made below to FIG. 2, whereby it is assumed that at least one of the switching contacts N1, N2 is in the closed state. Here, the logical values "0" or "1", in conjunction with the control signals V1 and V2, mean that the appertaining switching contacts N1 and N2 are to assume the closed or open state, depending on the specific wiper position X and on the threshold value Vr.

The microcontroller 16 emits watchdog signals Vw that change dynamically at brief, irregular intervals between two logical states. In the process step A that is repeated at time intervals, when a first test interval Δt1 is started, a failure of the microcontroller 16 is simulated by means of programmed discontinuation of the watchdog signals Vw. The subsequent process step B checks whether the absence of the watchdog signals Vw is detected by the monitoring switching means 20. If the watchdog monitoring by the switching means 20 is intact and if the watchdog signals Vw are absent, then the switching contact N1 and/or N2, if it was previously in the closed state, has to make the transition to the open state due to the removal of its power supply, the first supply potential Vbb. In the positive case, this state transition, which was recognized by the microcontroller 16, leads to the termination of the first test interval Δt1 and to the resumption of the emission of watchdog signals Vw. In the negative case, the appertaining control signal V1 and/or V2 is set so as to open the switching contacts N1 and/or N2. In this manner, in case of failure of the monitoring watchdog function, the at least one switching contact N1 and/or N2 permanently makes the transition to the open state. The emission of watchdog signals Vw continues to be absent.

In the repeated process step C, which is time-staggered with respect to process step A, when a second test interval Δt2 begins, a switch-over point of the at least one control signal V1 and/or V2 into the opening state is simulated, if said signal had been at the closing signal level until then. In the subsequent process step D, the current-breaking capacity of the appertaining switching contact N1, N2 is tested in conjunction with the appertaining output circuit 18 or 19. If the current-breaking capacity is intact, the switching contact N1 and/or N2 that had been closed until then has to make the transition to the open state due to the change of the appertaining control signal V1 and/or V2. In the positive case, this state transition, which was recognized by the microcontroller 16, leads to the termination of the second test interval Δt2 and to the control signal V1 and/or V2 being switched back to the closing signal level. In the negative case, the emission of the watchdog signals Vw is terminated and the output of the switching contact N1 and/or N2 that has subsequently been disconnected from its power supply functions as an open contact at the periphery of the position switch. The at least one control signal V1, V2 continues to assume the opening signal level.

Outside of the test intervals Δt1 and Δt2, the process step E tests whether the physical output state of the switching contacts N1 and N2 corresponds to the logical default value from the microcontroller 16. In the positive case, that is to say, in case of correspondence, the function monitoring is continued with the process steps A to E. In the negative case, that is to say, if the state of the two switching contacts N1 and N2 does not correspond to the control signals V1 and V2, then the control signal V1 and/or V2, which so far had assumed the closing signal level, is set to open and the emission of the watchdog signals Vw is terminated.

The method according to the invention ensures that a negative test result in one of the process steps B, D or E causes the electronic switching contacts N1 and N2 to be inevitably opened, both by terminating the emission of watchdog signals Vw as well as by setting or halting the control signals V1 and V2 at the opening signal level. Through the inevitable opening or holding open of the switching contacts N1 and N2 if the position switch 2 fails to function, the pertinent safety regulations are met which require that, in case an electromechanical or an electronic-mechanical position switch should fail, the switching contacts must not assume the active, that is to say, closed state.

In order to explain the switching arrangement according to the invention, reference is made below to FIG. 3. The reference numerals employed before in FIG. 1 are used for the same function elements.

The reference potential GND or the second supply potential Vdd at a value of +5V relative to the reference potential GND is supplied to the microcontroller 16 at its connections VSS and VDD. The external connections of the potentiometer R1 are supplied with an external voltage via the outputs PTB0 and PTB1 of the microcontroller 16. From the wiper of the potentiometer R1, the wiper voltage Vs is fed to an analog input AD0 of the microcontroller 16. The acknowledgement key S1 connects the second supply potential Vdd to a voltage divider R14, R15 leading to the reference potential and whose dividing point is connected to an input PTB7 of the microcontroller 16. The control signals V1 and V2 emitted at the control outputs PTB5 and PTB3 of the microcontroller 16 serve to control the output circuits 18 and 19. The output circuit 18 or 19 consists of the electronic switching contact N1 or N2 as well as of an upstream threshold value switch. The threshold value switch that is upstream from the switching contact N1 or N2 is provided with an NPN transistor T7 or T10 in an emitter circuit. A Z-diode Z1 or Z2 and a voltage divider R19, R20 or R8, R9 are located upstream from the transistor T7 or T10. On the collector side, the transistor T7 or T10 is connected to a load resistor R21 or R25 and to the input IN of the switching contact N1 or N2. The driver outputs Q1, Q2 of the switching contacts N1, N2 serve to actuate electric devices at the periphery of the position switch 2. The supply connections VBB of the output circuits 18, 19 are supplied via a supply driver N3 with the first supply potential Vbb at a value of, for example, +30V. When the control signal V1 or V2 has assumed the closing signal level, that is to say, the high level, then the switching contact N1 or N2 in question is in the closed state. In this case, a high level leading to the reference potential is present at a peripheral load that is connected to the driver output Q1 or Q2, said high level being somewhat below the first supply potential Vbb. In contrast, when the control signal V1 or V2 has assumed the opening signal level, that is to say, the low level, then the switching contact N1 or N2 in question is in the open state. In this case, a low level leading to the reference potential is present at a peripheral load that is connected to the driver output Q1 or Q2, said low level being identical to the reference potential GND. In the example, the microcontroller 16 used is a commercially available microcontroller bearing the model designation M68HC908QY4 made by Motorola Inc. and the electronic switching contacts N1, N2 as well as the supply driver N3 are commercially available circuits sold by Infineon Technologies AG and bearing the model designation BTS 4140 N which, on the output side, contain a vertical N-channel-power MOSFET.

Via an output PTB2, the microcontroller 16 emits watchdog signals Vw that dynamically change in short, not necessarily regular intervals between two logical state levels, until these signals stop at the beginning of the first test intervals. A subsequent active time stage 22 assumes different output states, depending on whether dynamic watchdog signals Vw are present or not. The time stage 22 contains a first amplifier stage 30 with a PNP transistor T9 in a collector circuit whose emitter is connected to the second supply potential Vdd. On the input side, the time stage 22 is provided with a passive differentiating element 23, consisting of the series connection of a first capacitor C9, a resistor R27 and a resistor R23 leading to the second supply potential Vdd. The connection point of the resistors R23, R27 that function as voltage dividers is connected to the base of the transistor T9. The first amplifier stage 30 works together with a passive integrating element 24. The integrating element 24 consists of the series connection of a resistor R29 on the collector side and of a parallel circuit leading to the reference potential, of a second capacitor C8 and of two series-connected discharge resistors R5, R6. A second amplifier stage 31 contains an NPN transistor T5 in a collector circuit and the integrating element 24 on the input side. The transistor T5 is connected via its emitter to the reference potential, via its base to the connection point of the resistors R8, R9 and via its collector to a load resistor R24 leading to the first reference potential Vbb.

Dynamic watchdog signals Vw present on the input side at the differentiating element 23 of the time stage 22 bring about a brief recharging of the second capacitor C8 via the first amplifier stage 30 during each transition from high level to low level, so that, at the connection point of the discharge resistors R5, R6, a potential is maintained that keeps the transistor T5 in the conductive state with a low level at the collector. The conductive state of the transistor T5 corresponds to a first output state of the time stage 22. If dynamic watchdog signals Vw are absent, the transistor T9 remains blocked so that, as a result of increasing discharging of the second capacitor C8, the transistor T5 goes into the blocked state with a high level at the collector. The blocked state of the transistor T5 corresponds to a second output state of the time stage 22.

The time constants of the differentiating element 23 as well as of the integrating element 24 are selected in such a way that the time stage 22— due to the occurrence of an individual watchdog signal—would assume the first output state and, with a delay, would fall back to the second output state. The time stage 22 is kept in the first output state through dynamic, that is to say, constantly changing watchdog signals Vw, as a result of which the subsequent supply driver N3 is activated. When watchdog signals Vw are absent, the time stage 22 toggles to the second output state, as a result of which the supply driver N3 is deactivated. When dynamic watchdog signals Vw are emitted once again, the time stage toggles back to the first output state. In the active state, the supply driver N3 conducts the first supply potential Vbb that is present at its supply input VBB virtually undiminished to the output circuits 18 and 19 via its driver output Q3. In this case, the switching contact N1 or N2, depending on the logical default value from the control signal V1 or V2 emitted by the appertaining microcontroller 16, can assume the closed (i.e. conductive) state or the open (i.e. blocked) state. In the deactivated state, the supply driver N3 disconnects the output circuits 18, 19 from the first supply potential Vbb, whereby, due to the resistor R22 leading to the reference potential, the driver output Q3 assumes the reference potential GND. In this case, the switching contact N1 or N2, independent of the logical default value from the microcontroller 16, indicates a state that is recognized by the periphery of the position switch 2 as being open. Therefore, if the watchdog signals Vw are absent, either intentionally during testing within the scope of first test intervals or else as a result of a failure of the microcomputer 16, the switching contact N1 and/or N2, if it was previously in the closed state, should make the transition to the open state.

The output Q1 or Q2 of the switching contact N1 or N2 is actively connected via an additional amplifier stage 32 or 33 to a control input PTB6 or PTB4 of the microcontroller 16 which, during the first test intervals, internally checks the state of the switching contacts N1 and N2 against the expected logical result. The additional amplifier stage 32 contains an NPN transistor T8 in an emitter circuit. The transistor T8 is connected via its emitter to the reference potential, via its collector to the control input PTB6 as well as to a load resistor R28 leading to the second reference potential Vdd. The base of the transistor T8 is connected via a series resistor to the output Q1. With a parallel arrangement on the base side leading to the reference potential and consisting of a capacitor C6 and a discharging resistor R17, the series resistor R18 forms an interference-suppression element for suppressing brief signal transitions that occur due to internal or external interferences and that can otherwise cause erroneous evaluations by the microcomputer 16. The additional amplifier stage 33 connected to the drive output Q2 likewise consists of an NPN transistor T6 in an emitter circuit, a load resistor R10 and an interference-suppression element 33 which, in turn, consists of a capacitor C5, a discharge resistor R12 and a series resistor R13.

When the watchdog monitoring is functioning properly, that is to say, when the time stage 22 and the supply driver N3 are intact, the switching contact N1 and/or N2—which was closed before the first test interval—makes the proper transition to the open state. If the microcontroller 16 recognizes the expected state transition via its control input PTB6 and/or PTB4, said microcontroller 16 once again emits dynamic watchdog signals Vw via its output PTB2. Then the time stage 22 toggles back to the first output state and releases the first supply potential Vbb for the output circuits 18 and 19, in response to which the briefly opened switching contact N1 and/or N2 once again assumes its closed state. As a result of the small switching-related and program-related delay times, the interruption of the closed state of the switching contact N1 and/or N2 that occurred is not long enough that it could have been perceived by a consumer that is connected to the driver output Q1 or Q2. In contrast, if the watchdog monitoring is faulty, that is to say, in case of a defect of the time stage 22 and/or of the supply driver N3, during which the output circuits 18 and 19 are not disconnected from the first supply potential Vbb during the first test interval, the microcontroller 16 cannot receive the expected state transition of the switching contact N1 and/or N2 at its control input PTB6 and/or PTB4, either. The microcontroller 16 still does not emit watchdog signals Vw, and at the same time, it sets the control signal V1 and/or V2 belonging to the switching contact N1 and/or N2 to the state level that causes the switching contact N1 and/or N2 to make the transition to the open state, and it supplies an error message to the LED display H1 via its output AD1. However, if a defect of the time stage 22 and/or of the supply driver N3 should manifest itself in the fact that, in spite of the presence of watchdog signals Vw, the output circuits 18 and 19 are disconnected from the first supply potential Vbb, then in this case, of course, both switching contacts N1 and N2 are opened. Consequently, in any case, a defect in the watchdog monitoring leads to an inevitable opening of the electronic switching contacts N1, N2.

Figure 3:
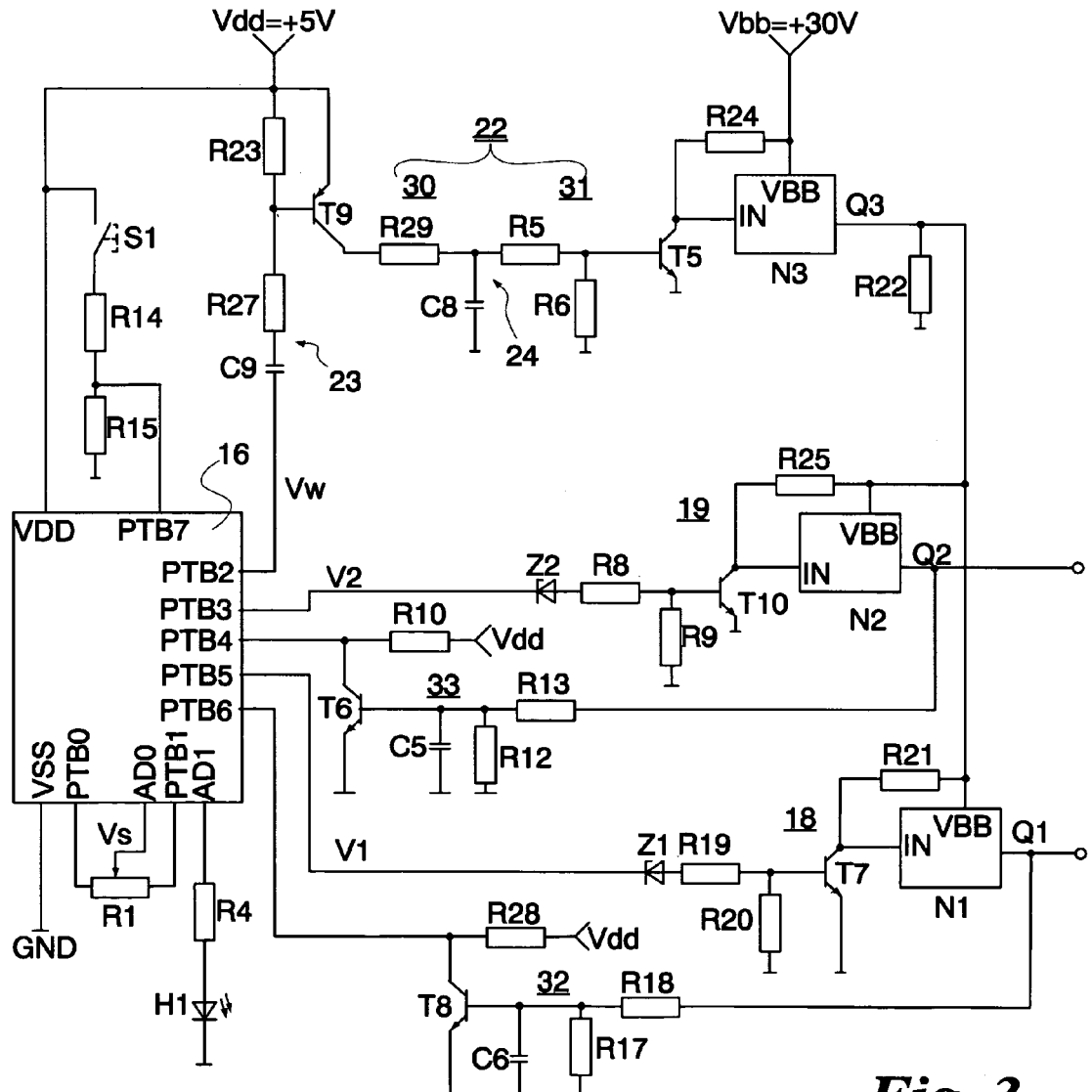
FIG. 3: a representation of a switching arrangement according to the invention.

The switching arrangement according to the invention shown in FIG. 3 also allows the current-breaking capacity of the output circuits 18 and 19 to be checked, especially that of the electronic switching contacts N1 and N2. For this purpose, at the beginning of the second test intervals, the closing control signal V1 and/or V2 emitted by the microcontroller 16 is switched over from the high level to the low level. If the output circuit 18 or 19 is intact, this should cause the previously closed switching contact N1 and/or N2 to make the transition to the open state. This state transition is, in turn, read into the microcontroller 16 from the driver output Q1 and/or Q2 via the already described additional amplifier stage 32 or 33 and internally compared to the expected test state. If current-breaking capacity is present, then the control signal V1 and/or V2 is once again reset to the closing signal level by the state transition that occurs at the control input PTB6 and/or PTB4 during the second test intervals. The interruption of the closed state of the switching contact N1 and/or N2 that has occurred is also so brief here as well that it could not be perceived by a consumer connected to the driver output Q1 or Q2. However, it can happen that the output circuit 18 and/or 19 has lost its current-breaking capacity due to a defect, especially as a result of the fusing of the output path of the electronic switching contact N1 and/or N2. In this case, the appertaining driver output Q1 or Q2 does not report a state change from the closed state to the open state back to the control input PTB6 or PTB4. In this case, the microcontroller 16 does not set the control signal V1 or V2 back to the closing signal level. Instead, further emission of watchdog signals Vw via the output PTB2 to the time stage 22 does not occur, which results in a disconnection of the output circuits 18, 19 from the first supply potential Vdd and thus an inevitable opening of the switching contacts N1, N2. Via its output AD1, the microcontroller 16 supplies a corresponding error message to the LED display H1.

Via its control inputs PTB6 and PTB4, the microcontroller 16 can also check whether the logical state at the signal outputs PTB5 and PTB3— which is determined by the wiper potential Vs in conjunction with the set threshold value Vr—corresponds to the state at the driver outputs Q1 and Q2. If there is no correspondence, for example, due to a defect in one of the output circuits 18 or 19 or in one of the additional switching stages 32 or 33, then a program of the microcontroller 16 sets the control signals V1, V2 at the opening signal level and the watchdog signals Vw are switched off. Here, too, the electronic switching contacts N1, N2 are inevitably opened. In this case as well, the microcontroller 16 supplies a corresponding error report signal to the LED display H1.

Figure 2:
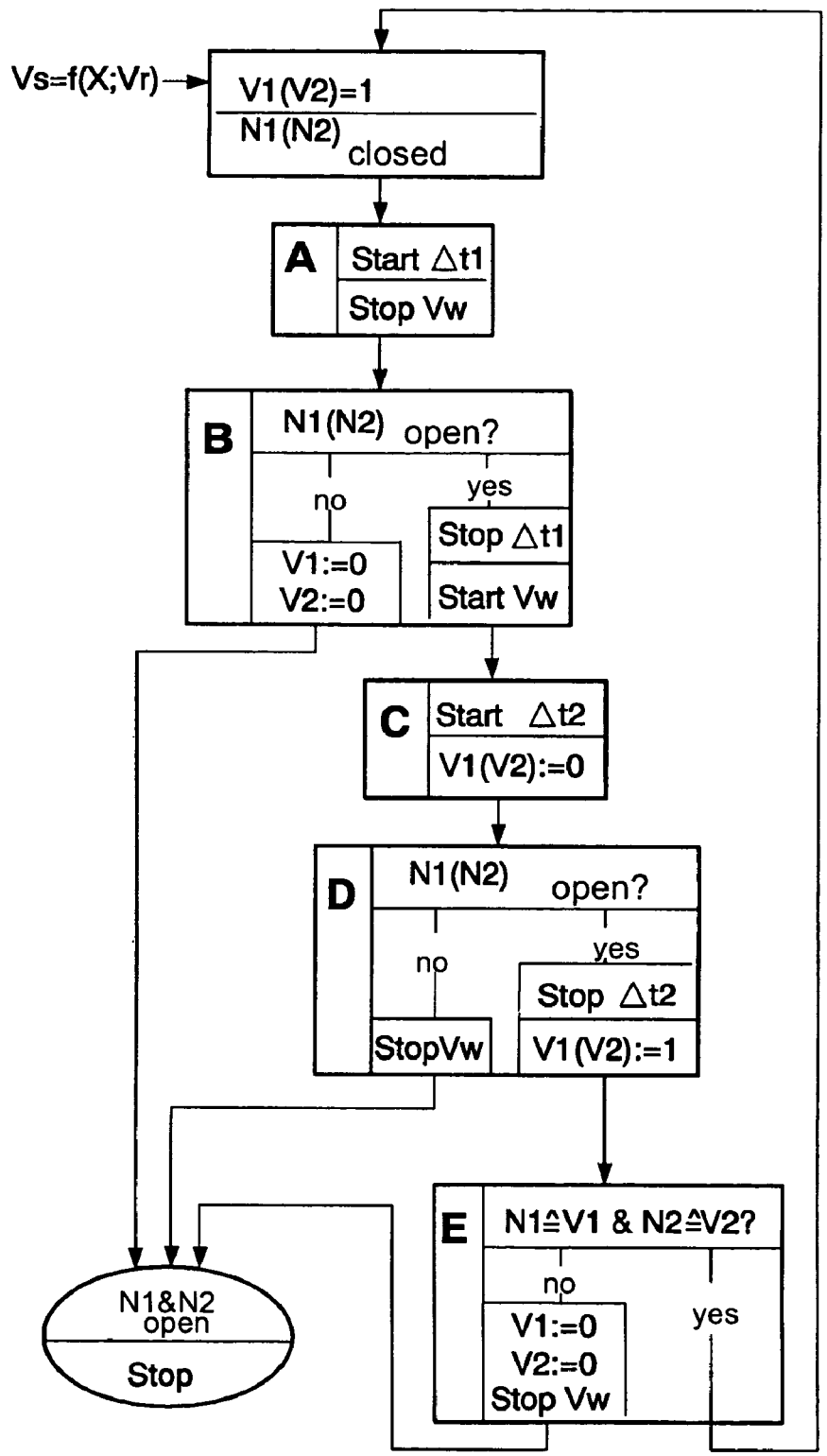
FIG. 2: a flow chart of the method according to the invention.

The signal diagrams shown in FIGS. 4 to 7 over the time t serve to provide an additional explanation of the method according to the invention shown in FIG. 2 as well as of the switching arrangement according to the invention shown in FIG. 3. In FIGS. 4 to 7, it is assumed that the first switching contact N1 functions as a make contact and the second switching contact N2 functions as a break contact. It is also assumed that, at the switch-over point in time to, the switch-over point is passed by the actuation tappet 8. Accordingly, under normal circumstances, at point in time t0, the first control signal V1 should make the transition from the low level to the high level and thus the first driver output Q1 belonging to the first switching contact N1 should make the transition from the open state (low level) to the closed state (high level). Accordingly, at point in time to, the second control signal V2 should make the transition from the high level to the low level and thus the second driver output Q2 belonging to the second switching contact N2 should make the transition from the closed state (high level) to the open state (low level).

Figure 4:
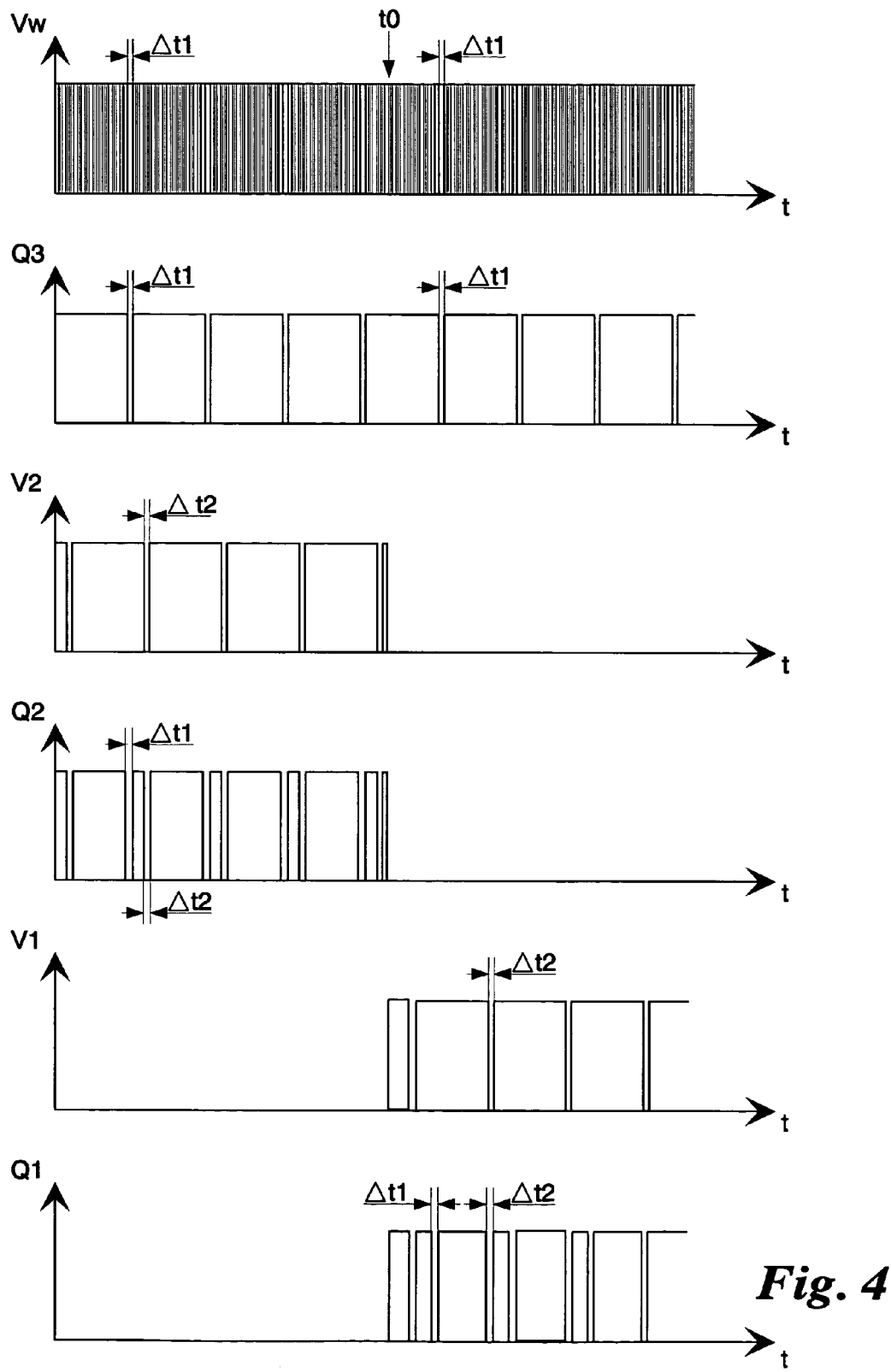
FIGS. 4–7: examples of signal diagrams pertaining to the invention.

FIG. 4 shows signal sequences under the assumption that no failures have occurred. The watchdog signals Vw following each other at close but not necessarily regular intervals change dynamically between the low level and the high level. During the first test intervals Δt1 for controlling the watchdog monitoring function, the watchdog signals Vw are interrupted, as a result of which the third driver output Q3 belonging to the supply driver N3 drops from the high level (virtually at the value of the first supply potential Vbb) to the low level (reference potential). Although the second control signal V2 has assumed the closing high level before the switch-over point in time to, due to the absence of a power supply, the second driver output Q2 briefly assumes the low level during the first test intervals Δt1. This state transition at the second driver output Q2 each time successfully terminates the first test intervals Δt1 when watchdog signals Vw are emitted once again. Before the switch-over point in time to, the first driver output Q1 of the open first switching contact N1 assumes the low level, irrespective of the first test intervals Δt1. After the switch-over point in time to, the first control signal V1 has assumed the closing high level. Due to the absence of a power supply during the first test intervals Δt1, the first driver output Q1 briefly assumes the low level. In this case, this state change at the first driver output Q1 each time successfully terminates the first test intervals Δt1. After the switch-over point in time t0, the second driver output Q2 of the now open second switching contact N2 has assumed the low level, irrespective of the first test intervals Δt1.

Outside of the first test intervals Δt1, watchdog signals Vw are emitted once again and the switching contacts N1 and N2 are supplied with power via the third driver output Q3 (high level). Before the switch-over point in time t0, during the second test intervals Δt2, the closing second control signal V2 is set to the low level in order to check the current-breaking capacity, as a result of which the second driver output Q2 drops to the low level. This state transition at the second driver output Q2 each time successfully terminates the second test intervals Δt2 when the second control signal V2 is reset once again to the closing signal level (high level). Before the switch-over point in time t0, the first driver output Q1 has assumed the low level, irrespective of the second test intervals Δt2. After the switch-over point in time t0, during the second test intervals Δt2, the closing first control signal V1 is set to the low level, as a result of which the first driver output Q1 drops to the low level. In this case, this state transition at the first driver output Q1 each time successfully terminates the second test intervals Δt2 when the first control signal V1 is reset once again to the closing signal level (high level). After the switch-over point in time to, the second driver output Q2 has assumed the low level, irrespective of the second test intervals Δt2.

Figure 5:
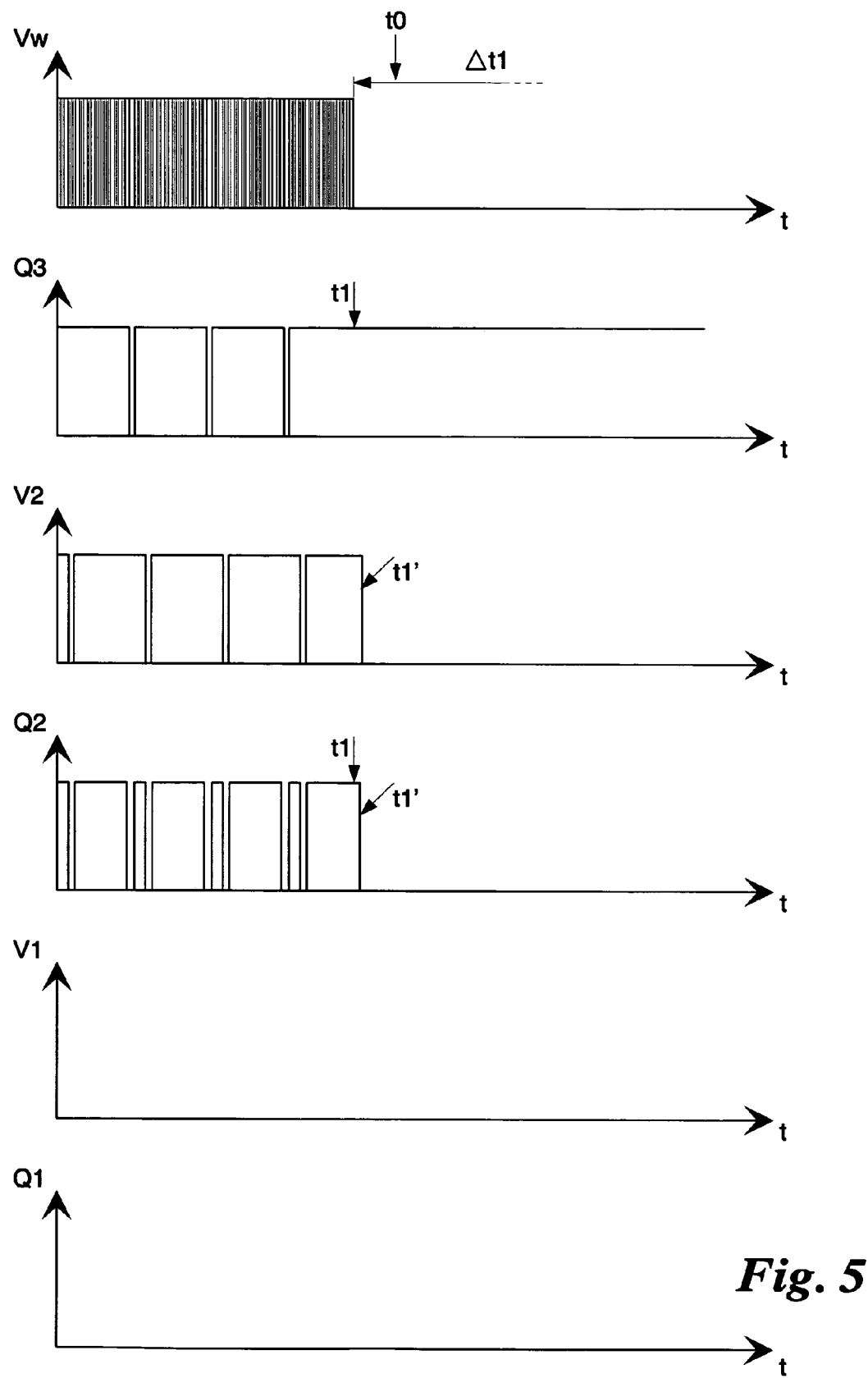

With the signal sequences according to FIG. 5, it is assumed that, at a point in time t1 that occurs, for example, before the switch-over point in time t0, an error function of the watchdog monitoring function is ascertained. After the beginning of one of the first test intervals Δt1, at the point in time t1, it is ascertained that the second driver output Q2— contrary to expectations—remains at the high level. The cause is to be sought in a malfunction of the switching means 20 that are monitoring the watchdog signals (FIG. 1) or else in a defect of the time stage 22 and/or of the supply driver (FIG. 3). The state transition at the second driver output Q2 that did not occur leads to a situation in which, at a point in time t1' with a small, system-related delay vis-à-vis the point in time t1, the second control signal V2 is permanently set at the opening state level (low level). The appertaining test interval Δt1 cannot be terminated and thus the emission of watchdog signals Vw cannot be resumed again either. By the same token, at the switch-over point in time t0, the transition of the first control signal V1 to the closing signal level does not occur. The position switch 2 is in a standby condition.

Figure 6:
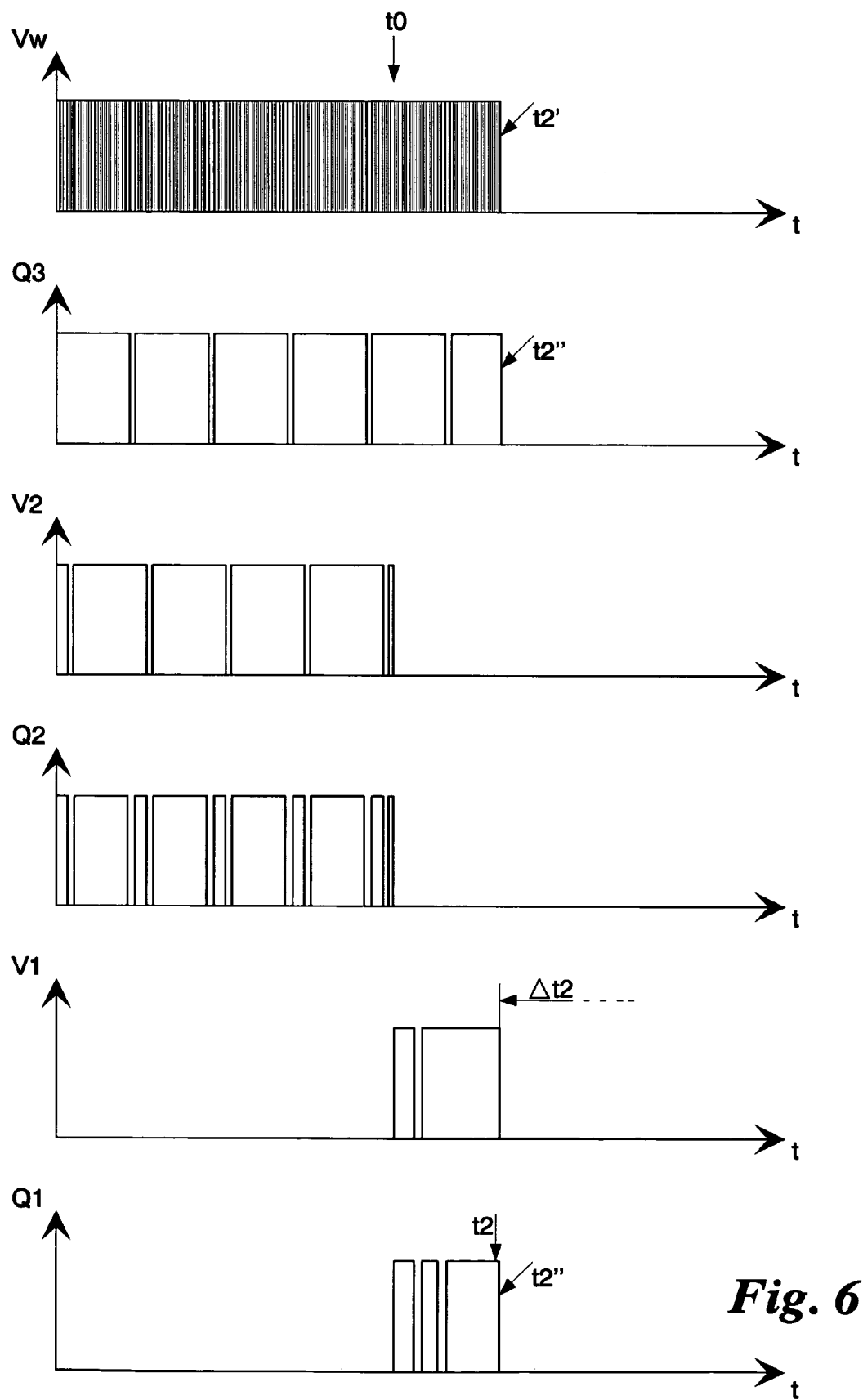

With the signal sequences according to FIG. 6, it is assumed that, at a point in time t2 that occurs, for example, after the switch-over point in time to, a malfunction of the current-breaking capacity is ascertained. After the beginning of one of the second test intervals Δt2, at the point in time t2, it is ascertained that the first driver output Q1—contrary to expectations—remains at the high level. The cause is to be sought in a malfunction of the output circuit 18 (FIGS. 1 and 3) that contains the first switching contact N1. The state transition at the first driver output Q1 that did not occur leads to a situation in which, at a point in time t2' with a small, system-related delay vis-à-vis the point in time t2, the watchdog signals Vw are permanently absent. Then the third driver output Q3, after a point in time t2' that is slightly delayed vis-à-vis the point in time t2", no longer supplies power to the switching contacts N1 and N2, as a result of which the first driver output Q1 inevitably assumes the low level corresponding to the open state. The appertaining test interval Δt2 cannot be terminated and consequently the control signals V1 and V2 can no longer assume the closing signal level (high level) either. In this case as well, the position switch 2 is in a standby condition.

Figure 7:
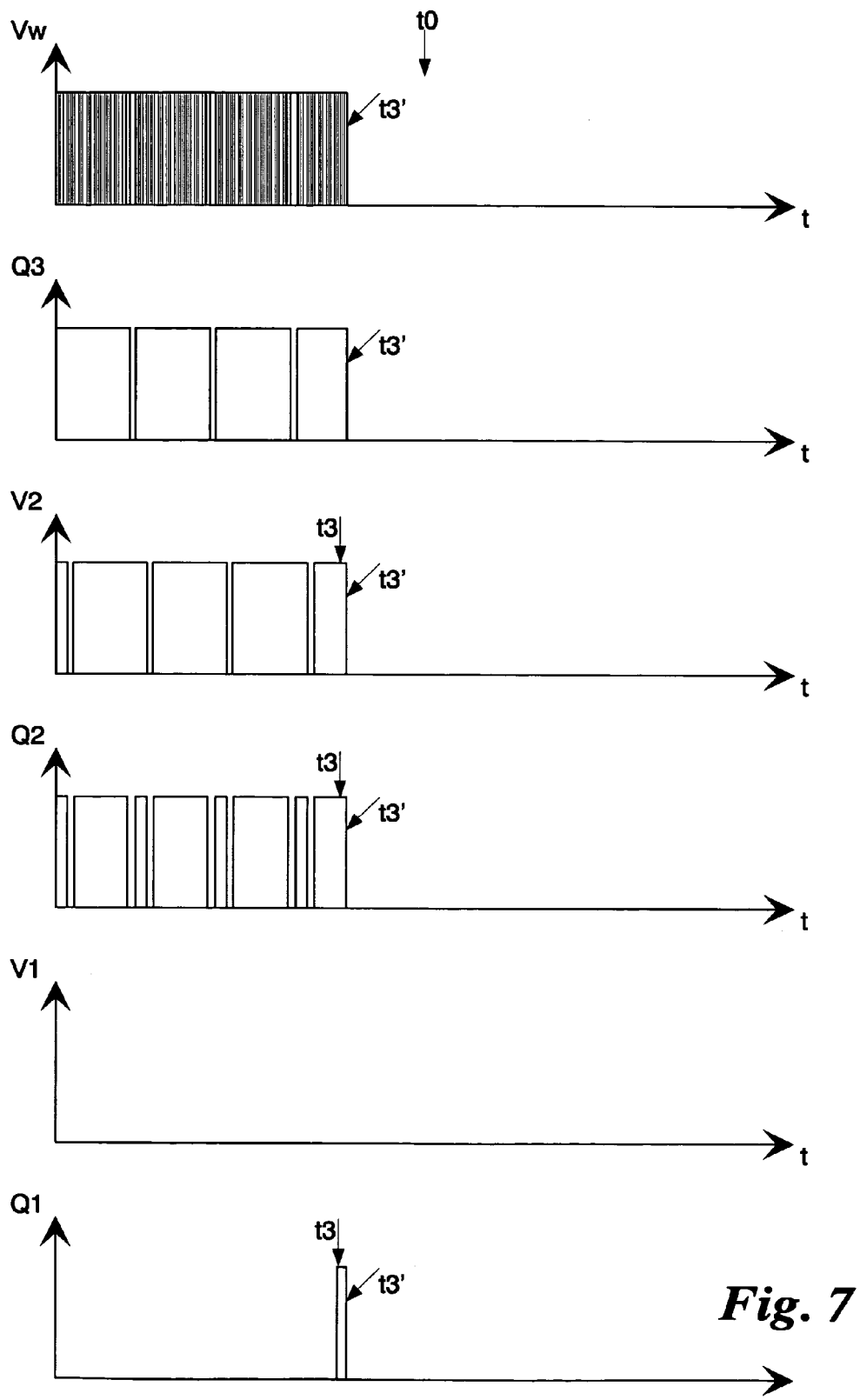

With the signal sequences according to FIG. 7, it is assumed that, at a point in time t3 that occurs before the switch-over point in time t0, some other absence of correspondence of the state of the switching contacts N1, N2 with the logical default value is ascertained. By the point in time t3, the states of the driver outputs Q1 and Q2 correspond to the control signals V1 and V2. At the point in time t3, the second driver output Q2 corresponds to the second control signal V2 at the high level. At the point in time t3, however, contrary to the low level of the first control signal V1 at the first driver Q1, a high level is ascertained. The cause is to be sought in a defect of the output circuit 18 (FIGS. 1 and 3) that contains the first switching contact N1 or in a defect of the additional amplifier stage 32 (FIG. 3) that leads from the first driver output Q1 back to the microcontroller 16. The ascertained contradiction between the first control signal V1 and the signal level of the first driver output Q1 leads to a situation in which, after a point in time t3' with a small, system-related delay vis-à-vis the point in time t3, the watchdog signals Vw are absent and the second control signal V2 is set at the opening signal level (low level). Then all three driver outputs Q1 to Q3 assume the low level. In this case as well, the position switch 2 is in a standby condition.

LIST OF REFERENCE NUMERALS 2 position switch
4 housing
6 pressure spring
8 actuation tappet
10 wiper
14 power supply means
16 microcontroller
18;19 output circuit
20 switching means
22 time stage
23 differentiating element
24 integrating element
26; 28 clamp terminals
30 . . . 33 amplifier stage
34; 36 external connections
A . . . E process steps
Cn capacitors
GND reference potential
H1 LED display
N1; N2 switching contacts
N3 supply driver
Q1 . . . Q3 driver output
R1 potentiometer
Rn resistors
S1 acknowledgement key
tn; tn'; tn" points in time
Tn transistors
V1; V2 control signals
Va external voltage
Vbb; Vdd supply potentials
Ve input voltage
Vr threshold value
Vs wiper potential
Vw watchdog signals
x wiper position
Y actuation direction
Z1; Z2 Z-diodes
Δt1; Δt2 test intervals

What is claimed is:

1. A method for function monitoring of an electronic-mechanical position switch, the electronic-mechanical position switch including:
   a housing;
   an actuation tappet;
   a potentiometer configured to be acted upon by the actuation tappet;
   an electronic switching contact;
   a microcontroller configured to emit a dynamically-changing watchdog signal and to detect a wiper potential present at a wiper of the potentiometer, compare the wiper potential to a stored threshold value and, depending on whether the wiper potential is above or below the threshold value, trigger a closing or opening of the electronic switching contact via a control signal;
   a power supply device; and
   a terminal;
the method comprising the consecutive steps:
   A) discontinuing, at a first test interval, an emitting of the watchdog signal and, in response, interrupting a power supply to the electronic switching contact using a switching device configured to monitor the watchdog signal;
   B) monitoring the electronic switching contact by the microcontroller and, if a first state transition of the electronic switching contact from a closed into an open state occurs, emitting again the watchdog signal, and, if the first state transition does not occur, setting the control signal as to open the electronic switching contact;
   C) switching over, during a second test interval that is staggered with respect to the first test interval, the control signal as to open the electronic switching contact; and
   D) monitoring the electronic switching contact by the microcontroller and, if a second state transition of the electronic switching contact from the closed into the open state occurs, switching the control signal back as to close the electronic switching contact, and, if the second state transition does not occur, terminating the emitting of the watchdog signal.

2. The method as recited in claim 1 wherein the first and the second test interval occur periodically.

3. The method as recited in claim 1 wherein the first and the second test interval occur after a time span of 500 to 1200 program cycles of the microcontroller.

4. The method as recited in claim 1 wherein the setting the control signal as to open the electronic switching contact is performed only after a repeated non-occurrence of the first state transition during the first test interval and the terminating of the emitting of the watchdog signal is performed only after a repeated non-occurrence of the second state transition during the second test interval.

5. The method as recited in claim 1 further comprising the step:
E) comparing, by the microcontroller outside of the first and second test interval, a switching state of the electronic switching contact with a logical default value and, if there is no correspondence, setting the control signal as to open the electronic switching contact and terminating the emitting of the watchdog signal.

6. The method as recited in claim 1 further comprising emitting an error message signal by the microcontroller after a detecting of an error.

7. A switching arrangement for function monitoring of an electronic-mechanical position switch, the switching arrangement comprising:
a housing;
an actuation tappet;
a potentiometer configured to be acted upon by the actuation tappet;
a power supply device configured to supply a potential;
a microcontroller including a watchdog signal output configured to emit a dynamically-changing watchdog signal, the watchdog signal being discontinued in a first test interval;
a time stage connected to the watchdog signal output, an output of the time stage assuming a first output state when the watchdog signal is present and assuming a second output state when the watchdog signal is not present;
a supply driver connected to the time stage, an output of the supply driver conducting the potential when the time stage assumes the first output state and blocking the potential when the time stage does not assume the first output state;
an electronic switching contact, the electronic switching contact being included in an output circuit, the output circuit being supplied by the output of the supply driver; and
a terminal;
wherein the microcontroller includes:
a control output connected to the output circuit and configured to provide a control signal, the control signal briefly assuming, in a presence of a closing signal level during a second test interval, an opening signal level, the second test interval being staggered relative to the first test interval; and
a control input connected to an output of the electronic switching contact; wherein the microcontroller is configured to:
detect a wiper potential present at a wiper of the potentiometer;
compare the detected wiper potential to a stored threshold value;
depending on whether the detected wiper potential is above or below the threshold value, trigger a closing or opening of the electronic switching contact via the control signal; and
process a control input signal present at the control input so as to:
resume emitting the watchdog signal if a first transition of the electronic switching contact from a closed into an open state occurs in the first test interval;
permanently set the control signal at the opening state level if the first state transition does not occur in the first test interval; and
discontinue emitting the watchdog signal if a second state transition of the electronic switching contact from the closed state to the open state does not occur in the second test interval.

8. The switching arrangement as recited in claim 7 wherein the time stage includes:
a first amplifier stage including a passive differentiating element at an input side thereof; and
a second amplifier stage including a passive integrating element at a input side thereof.

9. The switching arrangement as recited in claim 7 further comprising a third amplifier stage connected between the output of the electronic switching contact and the control input of the microcontroller.

10. The switching arrangement as recited in claim 9 wherein the third amplifier stage includes an interference-suppression device.

11. The switching arrangement as recited in claim 7 wherein the microcontroller includes a message output connected to an optical signal element, the message output being configured to emit a message signal in response to a non-occurrence of the first or second state transition of the electronic switching contact from the closed into the open state.

\* \* \* \* \*